United States Patent [19]

Otani et al.

[11] 4,008,909
[45] Feb. 22, 1977

[54] ACTUATOR FOR SAFETY SEAT BELT SYSTEM

[75] Inventors: Syuichi Otani, Tokyo; Hideoki Matsuoka, Kamakura, both of Japan

[73] Assignee: Nissan Motor Co., Ltd., Yokohama, Japan

[22] Filed: Feb. 25, 1974

[21] Appl. No.: 445,158

[30] Foreign Application Priority Data

Feb. 26, 1973  Japan ............................ 48-024419

[52] U.S. Cl. ..................................... 280/746; 188/1 B
[51] Int. Cl.² ............................................ B60R 21/10
[58] Field of Search ......... 280/150 SB, 150 B, 746, 280/745, 747; 180/82 C; 297/388, 389

[56] References Cited

UNITED STATES PATENTS

| | | | |
|---|---|---|---|
| 3,838,746 | 10/1974 | Andres | 280/150 SB |
| 3,871,470 | 3/1975 | Schwang | 280/150 SB |
| 3,891,271 | 6/1975 | Fieni | 280/150 SB |
| 3,901,531 | 8/1975 | Prochazka | 280/746 |

*Primary Examiner*—Robert R. Song

[57] ABSTRACT

A gas generator is integrally formed with a piston connected to a seat belt so that thrust developed by gas discharge into a piston chamber supplements the force of the gas on the piston to decrease the time required to move the piston and strain the seat belt.

2 Claims, 3 Drawing Figures

ACTUATOR FOR SAFETY SEAT BELT SYSTEM

The present invention generally relates to a safety seat belt system for a motor vehicle, and more particularly to an actuator to automatically retract and strain a seat belt during a vehicle accident.

It is beyond discussion that a safety seat belt makes an important contribution to the protection of a vehicle passenger from injuries during a vehicle accident provided it is worn properly with little slack. However, conventional safety seat belts are usually worn loosely during cruising of the vehicle so that seat occupants may travel in minimum discomfort. In case a collision occurs under such a seat belt usage condition, a seat occupant is unrestrained for a considerable time until the belt is sufficiently stretched by his or her forward movement by a distance corresponding to the slack of the seat belt. Although the occupant can be prevented from being thrown out of the seat, the initial forward movement brings about a substantial reduction in the open space between the occupant and a dash-board or seat in front of him. As a result, the passenger is in danger of the so-called "second collision" despite the initial sufficient open space.

To solve this problem, means to automatically retract and strain a safety seat belt when a vehicle encounters a collision have been proposed in recent years. An example is a retractor or actuator, which essentially consists of a cylinder-piston assembly provided with gas generating means. The piston movement exerts a pull on a seat belt to bring it into a fully strained condition from a slackened condition. In such an actuator, it is desirable that the straining of seat belts be accomplished with a minimum time delay from the instant of collision using as small a gas generating unit as possible.

It is therefore an object of the present invention to provide an actuator for a safety seat belt system which can strain a seat belt within a time short enough to prevent forward motion of a seat occupant during a vehicle accident and comprises a small gas generator.

A feature of an actuator of the invention is that the piston of the actuator for pulling the seat belt is provided with a gas generating device so that the reaction force of the generated gas jet can be imparted to the piston. The reaction force or thrust adds to the piston acceleration caused by gas pressure, resulting in straining the seat belt more quickly.

Other objects, features and advantages of the invention will become clear from the following description of an embodiment thereof with reference to the accompanying drawing, in which.

Figure 1:
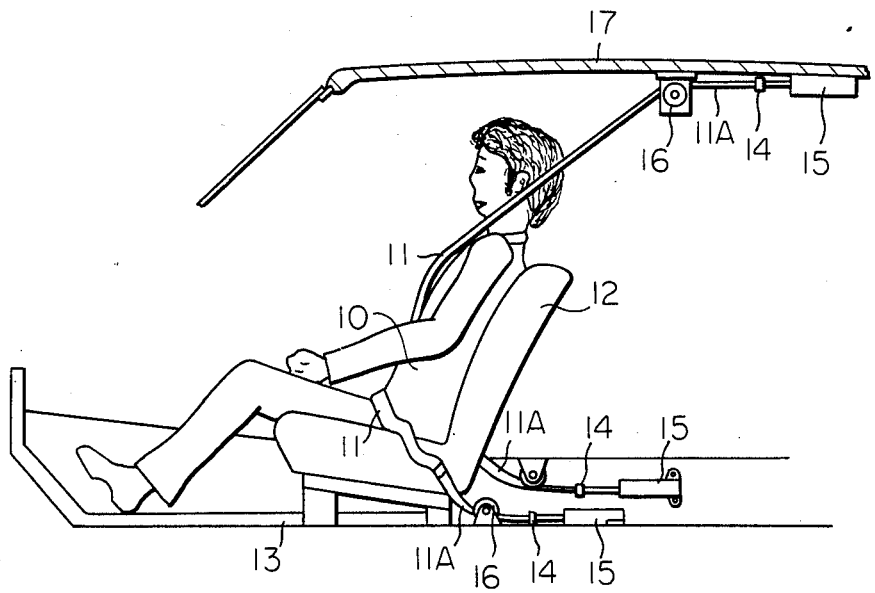
FIG. 1 is a schematic side view of a safety seat belt system for an automobile including an actuator of the invention.

In a safety seat belt system for an automobile seat occupant or passenger 10 shown in FIG. 1, a three-point type seat belt 11 for a seat 12 fixed to a floor panel 13 is worn by the seat occupant 10 with adequate slack so as not to hamper the freedom of the occupant 10 of changing posture to operate the vehicle and relieve physical fatigue during normal running of the vehicle. Each end-strap 11A of the seat belt 11 is connected to a joint member 14 attached to an actuator 15 via a pulley 16. The actuators 15 are fixed to the floor panel 13 and a roof panel 17 to act as anchor points of the seat belt 11. In case of a collision, the actuators 15 are energized by an electrical power source on board the vehicle in response to a signal from a shock sensor installed in the vehicle (not shown), and the end-straps 11A are pulled toward the actuators 15 to retract and strain the seat belt 11.

Figure 2:
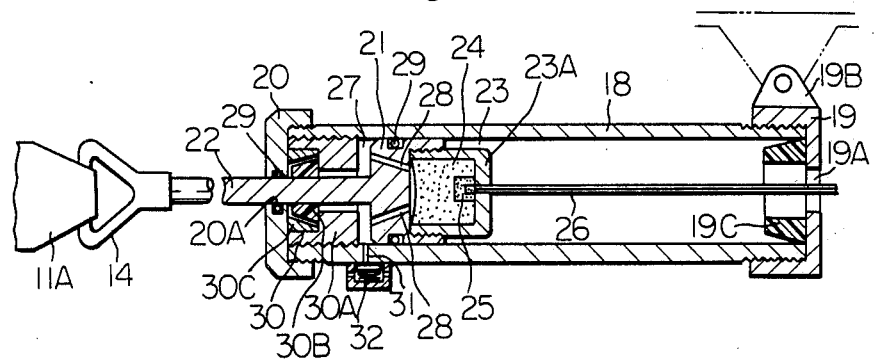
FIG. 2 is a longitudinal cross-sectional view of an embodiment of an actuator of the invention.

An embodiment of the actuator 15 according to the invention includes, as shown in FIG. 2, a cylinder 18 and cylinder heads or cap members 19 and 20 attached to the ends of the cylinder 18. The cap member 19 has a considerably large opening 19A and a joint member 19B to fix the actuator 15 to the floor panel 13 or roof panel 17. Within the cylinder 18 is a piston 21 having a rod 22 which extends outwardly from the cap member 20 through an opening 20A. As a gas generating device 23 to operate the piston 21, a threaded container or cup 23A containing a gas-generating composition 24 is fixed into a threaded hollow formed in the piston 21 at the end facing the cap member 19 so that the open end of the cup 23 is embedded in the piston 21. The cup 23 contains also an ignition head 25 having electrical leads 26. A space which serves as a working chamber 27 for generated gas is formed within the cylinder 18 defined by the inner face of the cap member 20 and the end face of the piston 21. The working chamber 27 is connected to the interior of the cup 23A through holes 28 drilled through the piston 21 and is made air-tight by means of O-rings 29 on the piston 21 and the cap member 20. To restrict the stroke of the piston 21, a bumper ring 19C is attached to the inner surface of the cap member 19. In the working chamber 27 is installed a retainer assembly 30 for restraining the outward movement of the rod 22, consisting of a hollow cylindrical block 30A fixed to the chamber 27 wall, a cone frustum shaped inner retainer 30B having an axial bore of a diameter nearly equal to that of the rod 22 to permit sliding movement of the inserted rod 22, and a cylindrical outer retainer 30C having a large tapered axial bore. The outer retainer 30C is co-axially fixed to the cap member 20 at the end having the smaller opening of the tapered bore. The inner retainer 30B is axially slidable between the cap member 20 and the cylindrical block 30A to a limited degree, and is made of a resilient material. When the rod 22 is pulled outwardly toward the seat belt 11, the inner retainer 30B comes into contact with the outer retainer 30C and is forced to compressively deform, so that the inserted rod 22 is clutched by the inner retainer 30B and the outward movement is thereby resisted.

When a conventional shock sensor on board the vehicle detects a shock exceeding a predetermined value during a collision, a signal is transmitted to a power source circuit (not shown) to make a firing current flow through the ignition head 25 in the actuator 15. The resulting combustion of the composition 24 in the cup 23A rapidly produces a large quantity of gas, which is ejected into the gas working chamber 27 through the holes 28. Then, the piston 21 is forced to move toward the cap member 19 by the gas pressure in the chamber 27 and the thrust from the gas ejection from the holes 28. Accordingly, the end-strap 11A is retracted rearward by a rapidly increasing tensile force, and the seat belt 11 is strained from the slackened condition. Full straining of the seat belt 11 can be accomplished in less than about 10 ms from the instant of collision, so that the seat occupant 10 is firmly secured to the seat 12 substantially before the start of his forward motion due to inertia force. As a result, the open space in front of the occupant 10 can be preserved.

In the subsequent stage, the passenger 10 is forced to move forward by his own inertia force due to the high deceleration of the vehicle, and the force is imposed on the seat belt 11. Consequently, the piston 21 is pulled back against the gas pressure in the chamber 27. In this case, however, the rod 22 encounters strong resistance from the retainer assembly 30 and makes practically no retro-movement. Therefore, the seat belt 11 is prevented from again becoming loose, and the tension on the belt 11 is preserved even after the composition 24 is burned out. Thus, the employment of the retainer assembly 30 leads to a considerable reduction in the required quantity of the composition 24.

As another means to control the movement of the piston 21, at least one gas port 31 equipped with a valve unit 32 may be provided at a suitable location through the cylinder 18 wall. The valve unit 32 is adjustable so that a portion of the gas in the chamber 27 may be exhausted through the port 31 when the gas pressure exceeds a predetermined value. The controlled gas exhaust prevents exertion of such excessive tension on the seat belt 11 which would be dangerous to the seat occupant 10, and absorbs kinetic energy from the occupant's forward motion when the actuator 15 does not include the retainer assembly 30. These effects may be achieved to a certain extent also by the gas port 31 alone.

Figure 3:
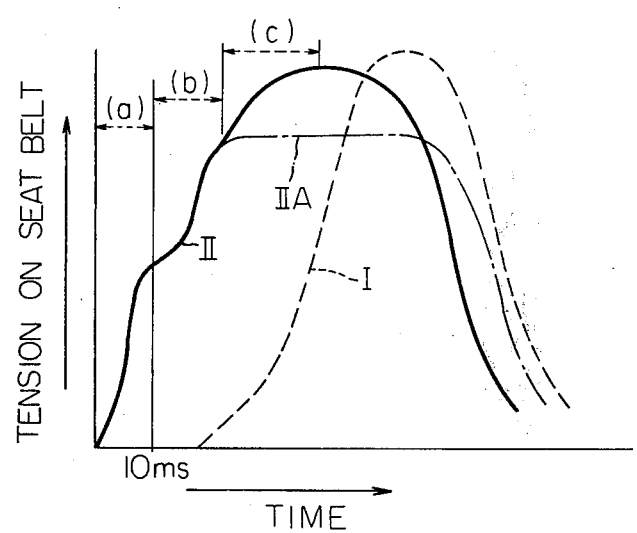
FIG. 3 is a graph showing the seat belt tension as a function of time after the instant of collision.

The curve I of FIG. 3 shows the tension exerted on the seat belt 11 of a conventional safety seat belt system as a function of time measured from the instant of collision. As mentioned before, a seat belt 11 in such a system remains in a slackened condition for a considerably long period, which is an important stage from the safety viewpoint, until the inertia force of the seat occupant 10 begins to act upon the belt 11. By means of an actuator 15 of the invention, the tension begins to rise practically at the instant of collision as shown by the region (a) of the curve 11. The subsequent region (b) represents the tension increase due to the inertia force of the occupant 10, and the increased tension is maintained for a period in the region (c) by the effect of the retainer assembly 30.

When the actuator 15 is provided with the gas port 31 and the valve unit 32 in place of the retainer 30, the tension remains at a constant value, which is usually smaller than the peak values in other cases, for a longer time accomplishing increased energy absorption as shown by the branched curve IIA.

As seen from the above description, an actuator 15 of the invention achieves the object of securing a vehicle passenger 10 to his seat 12 with a minimized time delay during a significant vehicle accident irrespective of the difference in the mode of the belt tension variance at later stages. Consequently, the passenger 10 can be protected against a second collision without sacrificing comfort during driving.

A gas generating device 23 incorporated with the piston 21 enables the piston 21 to move more quickly and smoothly at the initial stage of the actuator 15 operation as compared with gas generators installed in other parts of the actuator 15 such as the cap member 20 or the wall of the cylinder 18. The combination of the piston 21 and the gas generating device 23 is further advantageous in that the vehicle compartment and passengers are protected by the cylinder 18 from heat and/or possible debris due to the combustion of the composition 24.

The holes 28 of the embodiment of FIG. 2 for gas ejection into the chamber 27 may be eliminated when the cup 23 is inserted into the piston 21 to expose the open end of the cup 23 to the chamber 27. In such an arrangement, a good result is obtained by designing the area of the open end in full consideration of the nozzle effect.

It will be apparent that an actuator of the invention is applicable not only to a three-point type seat belt as shown in FIG. 1 but also to other types such as a simple lap belt or a shoulder harness.

What is claimed is:

1. In a safety belt system for a vehicle, an actuator for retracting and straining a safety seat belt during a collision of the vehicle comprising:
   a. a cylinder;
   b. a cylinder head mounted on said cylinder at one end thereof;
   c. a piston accommodated in said cylinder, having a rod extending outwardly therefrom through said cylinder head for connection with one end of the safety seat belt;
   d. a working chamber defined by said cylinder, cylinder head and piston; and
   e. a gas generating device for supplying a gas under pressure into said working chamber when energized during a collision of the vehicle, comprising a container, a composition capable of producing a gas by combustion thereof and means to ignite said composition contained in said container, said gas generating device being fixed to said piston such that at least a portion of an open end of said container is exposed to said working chamber; which further comprises means to limit a range of the movement of said rod toward said safety seat belt; and in which said means comprises:
   an outer retainer integral with said cylinder head and having a tapered bore coaxial with said cylinder, the small diameter end of said bore being adjacent to said cylinder head;
   a cylindrical block integral with said cylinder and having a bore coaxial with said cylinder; and
   a resilient, cone frustrum shaped inner retainer disposed within the tapered bore of said outer retainer, covered with said cylindrical block, and having a bore coaxial with said cylinder which is nearly equal in diameter to said rod which is arranged to extend therethrough; whereby
   said inner retainer abuts with said tapered bore of said outer retainer when said rod begins to move toward the safety seat belt and is compressively deformed to exert a force on said rod to resist further movement of said rod toward the safety seat belt.

2. An actuator as claimed in claim 1, in which a hole is formed through said cylinder to render said working chamber communicable with the atmosphere, and said hole is equipped with a pressure relief valve to limit the gas pressure in said chamber to a predetermined value.

* * * * *